Patented Apr. 22, 1924.

1,491,277

UNITED STATES PATENT OFFICE.

JOSEPH P. RUTH, JR., OF DENVER, COLORADO.

PROCESS FOR AERATING AND ACTIVATING SEWERAGE.

No Drawing.   Application filed April 14, 1921.  Serial No. 461,388.

*To all whom it may concern:*

Be it known that I, JOSEPH P. RUTH, Jr., a citizen of the United States, residing at the city and county of Denver and State of Colorado, have invented certain new and useful Improvements in Processes for Aerating and Activating Sewerage; and I do declare the following to be a full, clear, and exact description of the invention, such as will enable others skilled in the art to which it appertains to make and use the same.

The object of this invention is to furnish a process for aerating and activating sewerage which will be very efficient as compared with processes used heretofore, and which will materially reduce the time required for complete treatment and purification.

The invention consists in so treating the sewerage that air or oxygen subsequently introduced into the sewerage will be thoroughly broken up and diffused throughout the pulp body in the form of finely divided bubbles. By producing this fine subdivision a very large bubble-surface is presented for direct contact with the sewerage, this surface being very much larger than when the air or oxygen is introduced into the sewerage in normal condition. This increased contact surface results in much higher percentage of oxygen absorption and in a much higher percentage of efficiency in the conduction of the process, the percentage of absorption and consequent efficiency approaching 100% as the size of the bubbles decreases. It is easily proved that, for a given volume of air, the increase in combined bubble surface is inversely proportional to the square of the diameters of the different sizes of bubbles. This clearly shows what a great increase in aerating efficiency results from a given reduction in bubble-diameter.

The treatment for obtaining the diffusion above described consists in introducing into and mingling intimately with the sewerage a small amount of a contaminating agent capable of producing the desired diffusion. A highly desirable agent is a soluble oil such as the pine oils. Phenol is another agent which will produce good results, and certain soluble salts may be used in critical quantities to produce like results, such as sodium chloride. Any of these contaminating agents are capable of causing the air or oxygen to be broken up into fine bubbles, the size of the bubbles being controlled by the amount of agent added. When using pine oil, for instance, a small fraction of one per cent of oil figured on the sewerage to be treated may be used successfully, but a larger proportion of oil may be employed if desired.

I claim:

1. In a process for aerating sewerage, the step consisting in adding, prior to introduction of air, a soluble oil capable of causing air when introduced to be broken up into fine bubbles, and introducing said air.

2. A process for aerating sewerage comprising adding to the sewerage a soluble oil capable of causing air when introduced to be broken up into fine bubbles, and intimately mingling the oil with the sewerage.

3. A process of aerating sewerage, comprising adding to the sewerage a soluble oil capable of causing air when introduced to be broken up into fine bubbles, intimately mingling the oil with the sewerage, and introducing said air.

In testimony whereof I affix my signature.

JOSEPH P. RUTH, JR.